(12) United States Patent
Scott

(10) Patent No.: US 6,755,600 B2
(45) Date of Patent: Jun. 29, 2004

(54) CARGO BAR

(75) Inventor: Gary Michael Scott, Milwaukie, OR (US)

(73) Assignee: Burns Bros., Incs, Lake Oswego, OR (US)

( * ) Notice: Subject to any disclaimer, the term of this patent is extended or adjusted under 35 U.S.C. 154(b) by 0 days.

(21) Appl. No.: 10/002,780

(22) Filed: Oct. 29, 2001

(65) Prior Publication Data

US 2003/0082024 A1 May 1, 2003

(51) Int. Cl.[7] .............................................. B61D 45/00
(52) U.S. Cl. ...................................................... 410/151
(58) Field of Search ................................ 410/143, 145, 410/149, 150, 151, 152; 248/354.5, 354.6, 354.7; 211/105.3, 105.5, 105.6; 74/141.5, 143, 167; 254/12, 95, 108, 247

(56) References Cited

U.S. PATENT DOCUMENTS

| | | | |
|---|---|---|---|
| 3,049,328 A | | 8/1962 | Bishop |
| 3,090,600 A | * | 5/1963 | Smith |
| 3,110,506 A | | 11/1963 | O'Brien |
| 4,434,970 A | | 3/1984 | Boland |
| 4,669,934 A | * | 6/1987 | Wisecarver .................. 410/151 |
| 4,781,499 A | | 11/1988 | Wisecarver .................. 410/151 |
| 5,028,185 A | * | 7/1991 | Shannon ...................... 410/151 |
| 5,052,601 A | | 10/1991 | Carter et al. |
| 5,094,576 A | | 3/1992 | Fredelius ..................... 410/151 |
| 5,215,588 A | | 6/1993 | Rhieu |
| 5,378,095 A | * | 1/1995 | Shultz ......................... 410/151 |
| 5,443,342 A | * | 8/1995 | Huang ........................ 410/151 |
| 5,472,301 A | * | 12/1995 | Wallen ........................ 410/151 |
| 5,769,580 A | * | 6/1998 | Purvis ......................... 410/151 |
| 5,833,414 A | * | 11/1998 | Feldman et al. ............ 410/151 |
| 5,890,856 A | * | 4/1999 | Huang ........................ 410/151 |
| 5,947,666 A | * | 9/1999 | Huang ........................ 410/151 |
| 5,979,876 A | | 11/1999 | Cardona |
| 5,988,963 A | * | 11/1999 | Shiau ......................... 410/151 |
| 6,062,782 A | * | 5/2000 | Huang ........................ 410/151 |
| 6,247,882 B1 | * | 6/2001 | Huang ........................ 410/151 |

* cited by examiner

*Primary Examiner*—Stephen T. Gordon
(74) *Attorney, Agent, or Firm*—Robert L. Harrington; Schwabe Williamson & Wyatt

(57) ABSTRACT

A cargo bar having reduced costs due in part to being constructed from square tubes and due to being collapsible to a length that fits a 4 foot pallet so as to facilitate shipping and storage. Pressure induced extension of the cargo bar against opposed truck walls is provided by a rack and pinion gear arrangement, the rack teeth provided on a first tube wall and the pinion teeth provided on a pivotal lever mounted to a second tube. The bar ends have pressure pads that will conform to side walls of a truck or van and the tube interior is alternately fitted with retractable track pins that extend through the pads and retract behind the pads to accommodate different cargo bar systems.

13 Claims, 4 Drawing Sheets

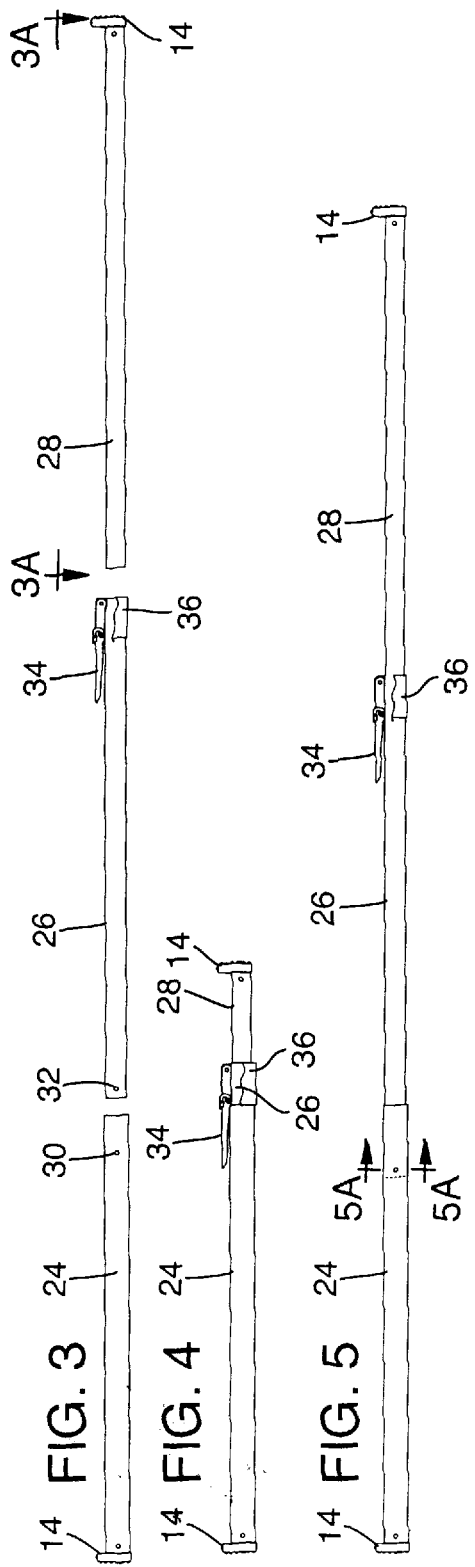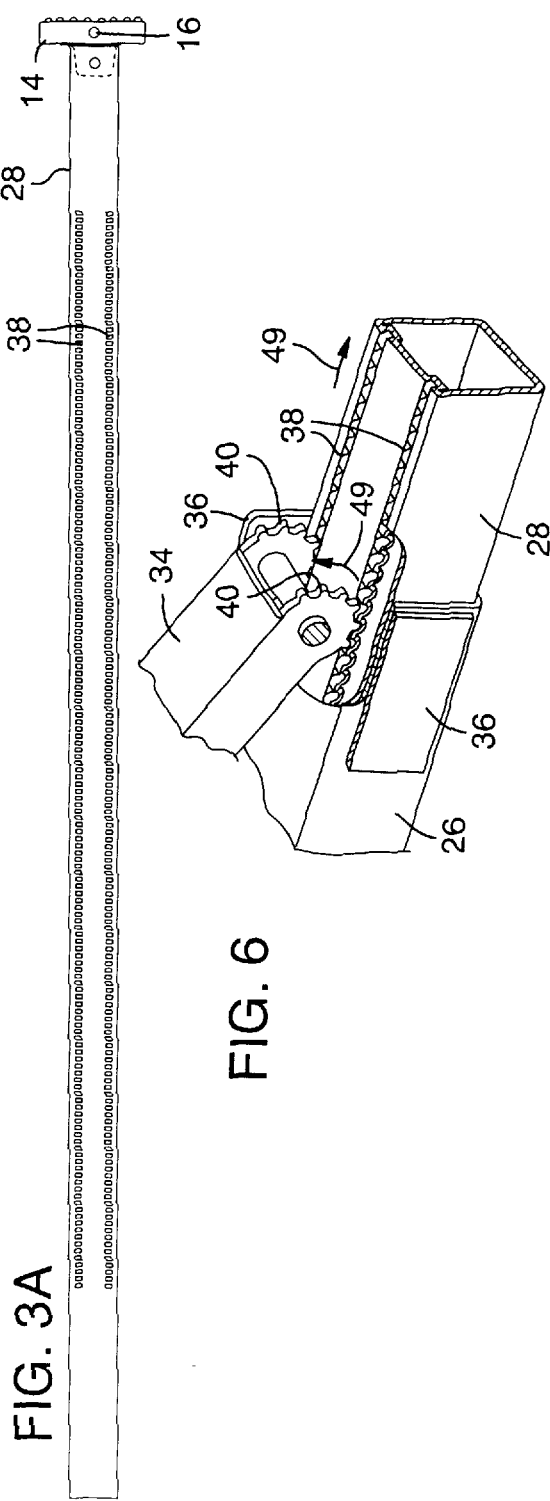

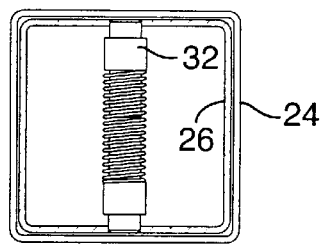
FIG. 5A
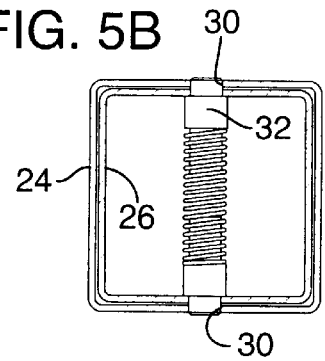
FIG. 5B
FIG. 7
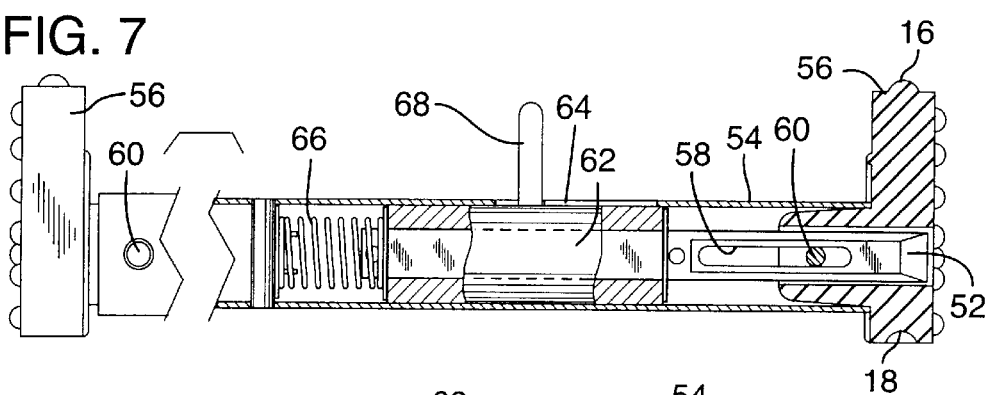
FIG. 7A
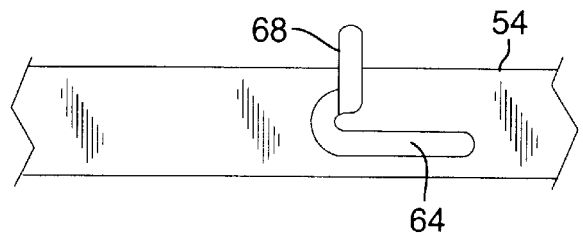
FIG. 8
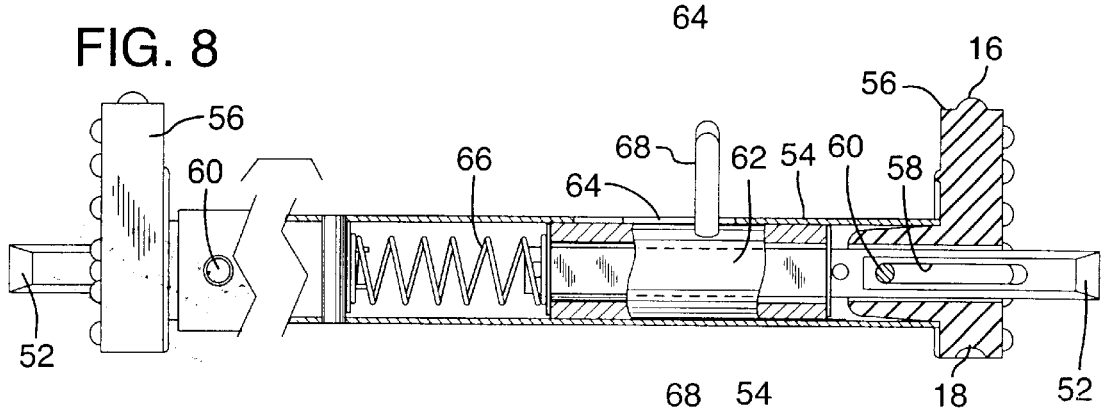
FIG. 8A
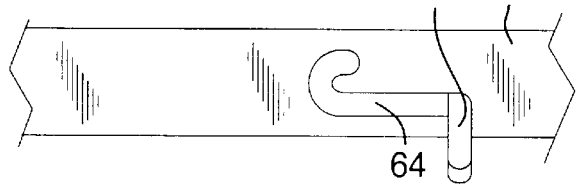

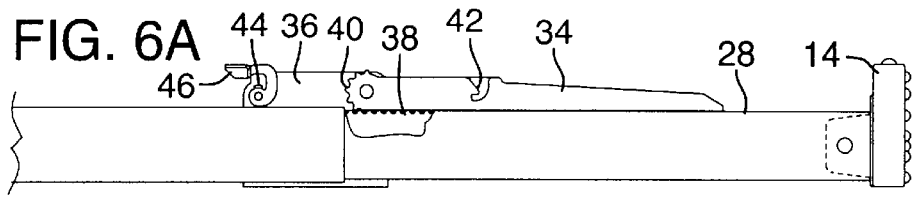
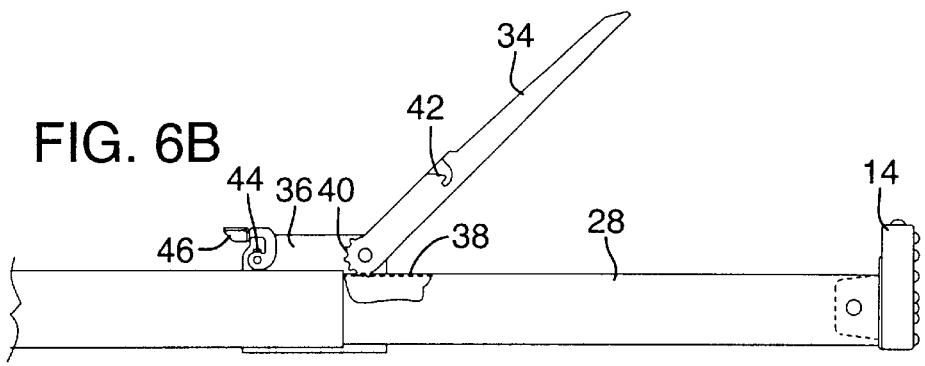
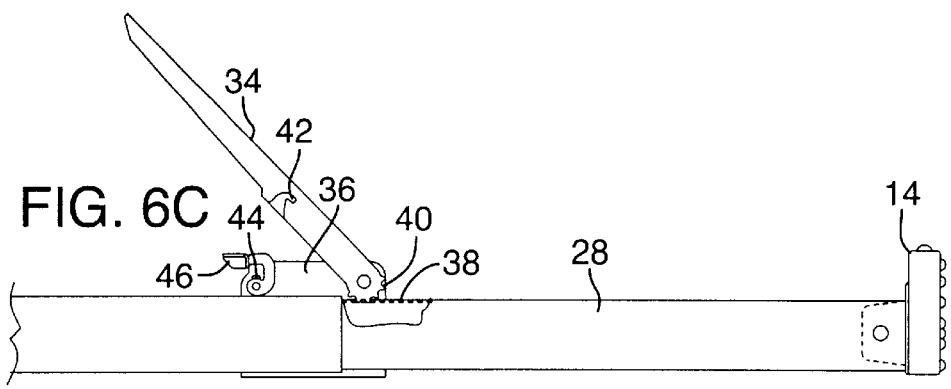
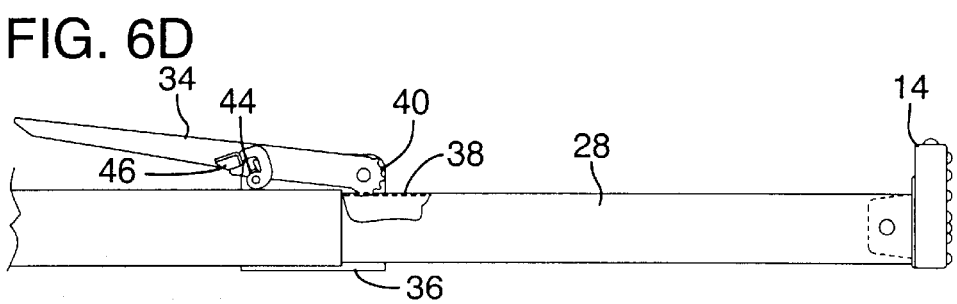
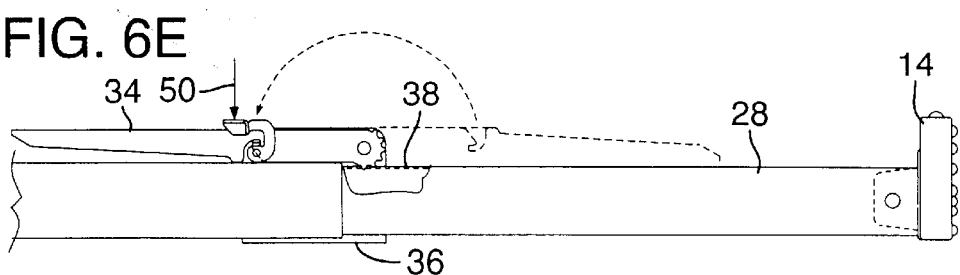

CARGO BAR

BACKGROUND OF THE INVENTION

This invention relates to a cargo bar that is installed between the side walls of vans and trucks to stabilize a load being hauled.

BACKGROUND OF THE INVENTION

The cargo bar is an elongate tube having a pressure pad at each end. The length is adjustable to adapt to the distance between walls and includes a lock for locking the tube length at an adjusted position. In use, a truck or van is partly loaded, front to back, and a cargo bar is placed against the partial load and extended between the side walls. The bar is extended to force the pads into tight engagement with the side walls and locked to secure the bar at that position. The partial load is thereby tightly held in place to avoid shifting as the van or truck is driven to a port of destination.

The present invention is intended to improve on the existing cargo bars in at least three categories.

Bar Length

The distance between the side walls of the van is about 8 feet. The bar length prior to the extension needs to approximate that length to provide convenient handling and installation. One needs to be able to place one end of the bar with the pad abutted against a side wall and then the bar is extended to place the other pressure pad at the other side wall. Whereas the different containers have similar but not the same width, the collapsed bar length is typically on the order of 7 feet (e.g., 7'2" to 7'4") with a foot or so of available extension. However, the 8 foot length is cumbersome for handling, shipping and storage of large quantities of the cargo bars, i.e., as the product moves from the factory to the truck owner/user. Whereas 4 foot pallets are common for handling quantities of products in general, the 7 foot length cargo bars hang about 1½ feet off both ends of a standard 4 foot pallet adding to the cost of handling, shipping and storage.

Bar Weight and Cost

The bar is subject to substantial stress and the bar must be anchored securely in place against the wall to avoid being dislodged by a shifting load. Most prior bars are cylindrical tubes constructed of steel that is both heavy and expensive. It is desirable to maintain the bar strength but to lessen the cost.

Gripping Mechanism

Gripping is provided by the pressure pads as discussed. The pads are flat and rigid with a configured elastomeric gripping surface. The pads are extended against the walls by a ratchet mechanism that is cumbersome and heavy. The gripping surface of the pads may not be secure in part because the walls against which the pads are pressed become slightly bowed under the pressure and this results in a curved wall surface with less surface area of the flat pressure pads being in contact with the wall. It is desirable to provide a pressure pad that more tightly abuts the wall and with a less cumbersome and more secure mechanism for extending the bar.

BRIEF DESCRIPTION OF THE INVENTION

The preferred embodiment of the invention is made of three square tubes that are assembled in telescoping relation. All three tubes are less than four feet in length and when assembled and in a collapsed condition do not exceed four feet in length. The square tubes are inherently stronger and can be made lighter with a thinner wall material to substantially reduce the cost. The first and second tube sections are provided with a lock mechanism that locks the first and second tube sections together in an extended relation. The extended position will likely be the preferred position and likely maintained throughout use in mounting and demounting the bar for securing a load. The telescoping action between the first and second tube sections is intended primarily to facilitate shipping and handling. However, the option of collapsing the bar to 4 feet is available simply by depressing the locking pins.

The second and third tubes remain in telescoping relation with the second tube section. A lever is mounted at the end of the second tube section into which the third tube moves in and out. The lever carries an elliptical pinion gear with peripheral teeth positioned for engagement with rack-like teeth formed in the corresponding side of the third tube and along a substantial length thereof. With the lever pivoted to its full unlocked position, the pinion teeth are disengaged from the rack teeth and the third tube can be fully extended into contact with a van or truck wall. The lever is pivoted to cause engagement of the pinion teeth with the rack teeth and as the lever continues to pivot, the third tube is forced outwardly into tight engagement with the wall. The elliptical configuration assures secure engagement of the teeth at the point of greatest resistance. A latch mechanism is engaged by the lever upon full extension to maintain the tight engagement with the walls. A release is engaged by the user to achieve unlocking and removal of the bar as desired.

The pressure pads of the preferred embodiment have a rigid center defined by the cross section of the tube, but the side areas surrounding the centers are adapted to slightly bow under the pressure of the lever induced extension. Thus, as the track or van wall is bowed, the bowed configuration is matched by the pressure pads to provide full surface-to-surface engagement.

The pads are provided with a nesting arrangement to enhance stacking of the multiple cargo bars for shipping and storage. A second embodiment of the cargo bar includes extendable pins that penetrate through the pad center to engage tracks mounted to the track or van walls as an alternate application of the cargo bars. Other improvements will become apparent upon reference to the following detailed description having reference to the accompanying drawings.

DESCRIPTION OF THE DRAWINGS

FIG. 3 is an exploded view of a cargo bar in accordance with the present invention, and FIG. 3A is a top view of a cargo bar section as viewed on view lines 3A—3A of FIG. 3;

FIG. 4 is a view showing the components of FIG. 3 in assembled relation as when stored and shipped;

FIG. 5 is a view showing the components of FIG. 3 in assembled relation as when securing a partial load in a truck box;

FIG. 5A is a section view as taken on sections lines 5A—5A of FIG. 5 and FIG. 5B is an alternate view of FIG. 5A, i.e., showing the lock disengaged and engaged;

FIG. 6 is an enlarged perspective view of the mechanism for tightening the cargo bar in a truck box and FIGS. 6A–6E sequentially illustrate the cargo bar of FIG. 5 in the process of being secured to the walls of a truck box by the mechanism of FIG. 6; and FIGS. 7, 7A, 8 and 8A are views illustrating an alternate embodiment of the invention.

DETAILED DESCRIPTION OF THE PREFERRED EMBODIMENT

Figure 1A:
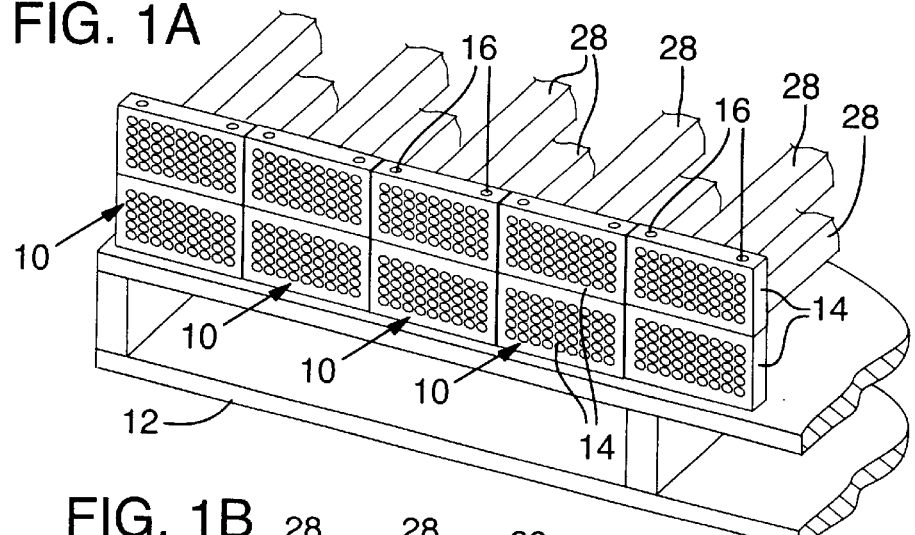
FIG. 1A illustrates in perspective view a quantity of cargo bars in accordance with the invention as stacked on a pallet.
Figure 1B:
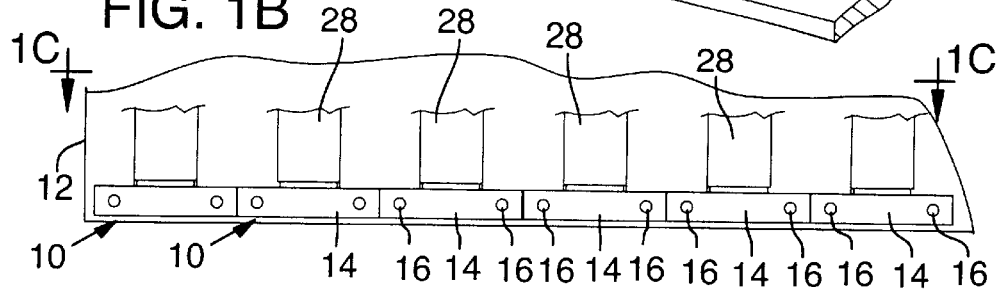
FIG. 1B is a top view and FIG. 1C is a front view showing in greater detail the nesting arrangement of the cargo bars as stacked in FIG. 1A.
Figure 1C:
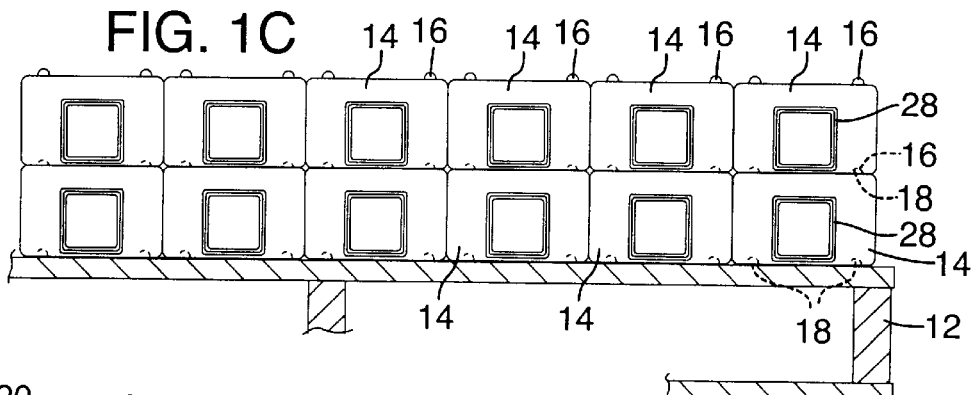

FIG. 1A schematically illustrates a number of cargo bars 10 loaded on a pallet 12 following manufacture. The loaded pallets are conveyed through commerce in the usual manner, i.e., stacked together on the pallet and the loaded pallets transferred to a warehouse, subsequently loaded onto trucks and hauled to a point of distribution. There it may be stored for a period of time and then shipped to a retail outlet or directly to a trucking company. FIGS. 1B and 1C are top and front views where it can be seen that the pressure pads 14 have protrusions 16 and mated recesses 18 that interfit to facilitate stacking of the cargo bars on the pallet 12.

It is desirable that the cargo bars fit a 4 foot pallet which is common for moving products through commerce and the present invention provides for shortening of the cargo bar length for shipping purposes to accommodate the conventional length of a pallet, i.e., four feet. The ability to load the bars on a 4 foot pallet results in reduced cost in shipping and storing of the cargo bars.

Figure 2:
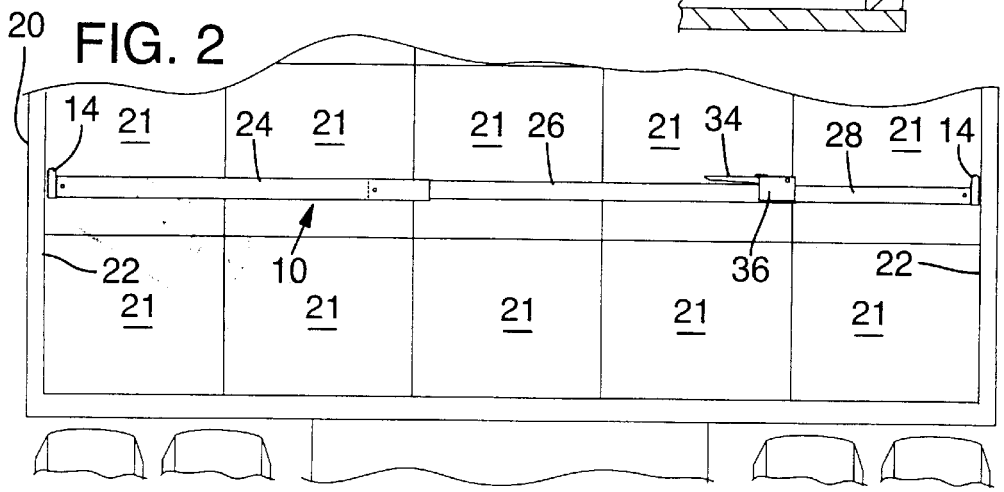
FIG. 2 is a rear view of a truck box containing a partial load and a cargo bar in accordance with the invention secured to the walls of the truck box to secure the partial load.

Reference is now made to FIG. 2 illustrates the use of the cargo bar of the invention for its intended purpose, i.e., securing loads. Illustrated is a truck box 20 in which freight items 21 are loaded. It is desirable upon many occasions to secure such partial loads against undesired shifting. The width of the box 20 is in the order of 8 feet between walls 22 and it is typically desirable that the bars 10 are sufficiently long to approximate the width (e.g., about 8 feet in length) but with a telescoping tube end 28 that is extended into abutting engagement with the opposing walls 22. More precisely, the bar length is forcibly extended to exert pressure against the walls and prevent dislodgement.

It will thus be understood that the cargo bar 10 is first desired to be a length of no greater than 4 feet to fit onto the pallet 12 but then when put in use, to have an approximate permanent length of about 8 feet for ready mounting to the width span of a truck box.

Reference is now made to FIGS. 3–5. FIG. 3 shows three tubes which include an outside or large tube 24, a middle tube 26 that is slidable inside the large tube 24, and an inside tube 28 that is slidable inside the middle tube 26. As noted, tube 24 includes a pressure pad 14 at its distal or outside end and a hole 30 strategically placed near its opposite end. The middle tube 26 is sized to fit inside tube 24. Tube 26 has a spring loaded pin 32 at its inserted end that is sized to fit hole 30 of tube 24. At the opposite end, tube 26 is fitted with a lever 34 pivotally mounted to a bracket 36 at the tube end. Tube 28 is sized to fit inside tube 26 and its distal end is fitted also with a pressure pad 14.

FIG. 4 illustrates the tubes 24, 26 and 28 as assembled into its fully collapsed relation and as so assembled is sized to fit a conventional pallet, e.g., 4 feet in length and width. The pin 32 is compressed into tube 26 as seen in FIG. 5A. FIG. 5 illustrates the cargo bar in a second assembled relation for operative use, i.e., securing a load as illustrated in FIG. 2. As will be noted, tube 26 is extended from tube 24 to a position whereat pin 32 is protruded into hole 30 (the position of FIG. 5B). This provides sufficient overlap to insure a rigid tube length from pad 14 on tube 24 to bracket 36 on tube 26. The tube 28 can be positioned at any position of extension from tube 26 as will now be explained.

FIG. 3A illustrates a top view of tube 28 taken on view lines 3A—3A of FIG. 3. Rack-like teeth 38 are provided as a double row of teeth along a substantial portion of the length of tube 28 as seen in FIG. 3A. The rack-like teeth 38 are engaged by pinion teeth 40 of lever 34 as seen in FIG. 6. As shown in FIG. 6A, the lever 34 is pivoted to its initial position where the pinion teeth 40 are not engaged with the teeth 38 of tube 28. The tube 28 can now be extended to a desired position of extension, i.e., substantially the distance between the side walls 22.

As the lever 34 is raised or pivoted to its inboard position (see FIG. 6B), the teeth 40 engage teeth 38 and continued pivoting of lever 34 causes the pinion teeth 40 to sequentially engage rack teeth 38 and force further outward or extended movement of tube 28 relative to tube 26 as illustrated by the arrows 49 in FIG. 6.

With reference to FIGS. 6C–6E, it will be noted that locking slot 42 on lever 34 engages lock stem 44 on latch 46 to force pivoting of latch 46 against the bias of spring (not shown) until the stem 44 is caused to seat in slot 42 by spring action of the spring. At this point the spring holds the stem 44 in slot 42 and the lever 34 is locked into the position of FIG. 6E. Unlocking is achieved by pressing latch 46 downward against the bias of the spring (note arrow 50). As previously discussed, the pinion teeth 40 are configured somewhat elliptical and as the lever is pivoted from the position of FIG. 6C to FIG. 6E, a progressively greater force is exerted by the pinion gear against the rack teeth to insure a forced engagement of teeth 40 with teeth 38.

Reference is now made to FIGS. 7, 7A, 8 and 8A illustrating an alternate embodiment of the invention. Whereas the cargo bar is typically designed to establish gripping through compression of pressure pads against the truck or van box walls, an alternate design is the provision of spaced horizontal tracks secured or formed in the side walls of the truck or van at frequent intervals along the length of the truck box. In this alternative embodiment, the pressure pads are augmented with retractable pins that fit the horizontal track. The pins need only extend into the tracks where they are supported at a desired elevation by the track. Pressure gripping is less necessary and the general structure of a track system of load securement is known to the art.

The alternate embodiment of FIGS. 7A and 8 provides for adaptation of the preferred embodiment disclosed in FIGS. 1–6 to also function in the track-type system of load securement. With reference to FIG. 7, it will be noted that a metal track pin 52 (configured to fit the track) is inset into the tube 54. Pressure pad 56 is thus available for gripping a side wall in the manner discussed above. However, should the cargo bar be applied to a track or van box equipped with the guide tracks, the track pins are extended from the tube 54 as shown in FIG. 8.

As noted, the track pins 52 include a mounting slot 58 that permits sliding of the track pin relative to mounting pin 60. The track pin 52 is mounted on a cylindrical slide member 62 contained in the tube 54. A rod 68 connected to slide member 62 extends laterally through a J slot 64 in tube 54. A compression spring 66 urges the slide member 62 and thus the track pin 52 through a hole in the pad 56 as illustrated in FIG. 8. The J slot 64 is shown in FIGS. 7A and 8A. It will be observed that the rod 68 is located at the bottom of the J slot in FIGS. 7 and 7A (to the left) and the rod 68 is located at the top of the J slot in FIGS. 8 and 8A (to the right). This positioning is accomplished manually. The rod 68 is manually forced down the tube slot and against the spring pressure of spring 66 to withdraw the track end 52 as shown in FIGS. 7 and 7A. The spring urges the rod against the short side of the J slot to retain the track pin in the withdrawn position. Again by manual movement, the rod 68 is forced down around the curve of the J slot to the long side where the spring now urges the rod 68 to the top of the slot with the track pin 52 extended as shown in FIG. 8. Readers will appreciate that a similar arrangement is provided at both ends even though shown for one end only in FIGS. 7 and 8.

It will be appreciated that the preferred embodiment of the invention employs three tube components to enable reduction of the bar length to a length suitable for handling and storing of the bars on a conventional 4 foot pallet. However, a number of the improvements as explained apply to a bar having two tube sections or components. Such would not fit the 4 foot pallet but can include the improved pressure pads, square tube configuration, the rack and pinion lever mechanism and the conversion of the bar to the track type cargo bar as viewed in FIGS. 7 and 8.

The invention encompasses the broad definition of the claims appended hereto with the understanding that the claim terms are intended to have their common meaning is understood generally by persons in the art. In particular, the invention is not limited to the embodiments herein disclosed.

What is claimed is:

1. A cargo bar comprising:
a plurality of slidable telescoping tubes defining opposed ends and having a collapsed length and an extended length that is more than twice the collapsed length;
a pressure pad at each of the opposed ends;
an actuator carried by a first one of said tubes and engageable with a second one of said tubes, said second tube extendable to a determined length relative to the first tube when not engaged by the actuator, a grip member forming part of the actuator and which selectively grips the second tube, said actuator providing mechanical advantage to produce additional extension of the second tube relative to the first tube, and a lock member for locking the tubes at said additional extended position.

2. A cargo bar as defined in claim 1 wherein rack-like teeth are provided on the second tube and said grip member is a pinion gear having gear teeth that are rotated into and out of engagement with said rack-like teeth, and a lever extended from said pinion gear for manual movement between positions of pinion teeth engagement and non-engagement with said rack-like teeth and in the position of engagement, said lever being further pivoted to achieve said additional extension of said second tube.

3. A cargo bar as defined in claim 2 wherein the lock member is mounted relative to the lever with the second tube in said additional extended position for engagement and locking of said lever at said extended position.

4. A cargo bar as defined in claim 3 wherein said first tube comprises telescoping tube sections that are collapsible for defining the collapsed length and are extendable for defining an intermediate length, and a second lock member locking said telescoping tube sections at the intermediate length.

5. A cargo bar as defined in claim 4 wherein the first and second tubes are configured to have a rectangular cross section.

6. A cargo bar as defined in claim 5 wherein the pressure pads are resistively deformable and upon engagement under pressure with opposed wall portions, conforming to the shape of the wall portions.

7. A cargo bar as defined in claim 6 wherein said pressure pads have center openings aligned with said tubes, track engaging pins slidably mounted within said tube ends and compression springs urging said pins into partial extension through said center openings, and a manually actuated releasable retraction mechanism for retracting said pins to a retracted position.

8. A cargo bar as defined in claim 1 wherein the filly collapsed length of the bar is a length of a conventional pallet and said pressure pads are square-shaped having a top edge and a bottom edge, said top edge and bottom edge cooperatively formed to provide nesting of upper and lower cargo bars when stacked on a conventional pallet for shipping and handling.

9. A cargo bar comprising:
a plurality of relatively slidable telescoping tubes cooperatively defining a range of cargo bar lengths having opposed ends and a pressure pad mounted at each of the opposed ends for engaging opposing side walls of a truck or van box;
said telescoping tubes including a first tube defining an outer side surface, said first tube and outer side surface slidable inside a second tube, rack teeth formed along said outer side surface of said first tube and a lever pivotally mounted at one end to an end of the second tube surrounding said first tube and as pivotally mounted defining a pivot axis, said lever end having pinion teeth disengaged from said rack teeth at one pivotal position of the lever and movable to a second pivotal position, said pinion teeth varying in spaced relation to the pivot axis, said pinion teeth engaging the rack teeth upon pivoting said lever toward said second pivotal position to increasingly apply forced engagement and extension of the first tube from said second tube, and a lock mechanism mounted on said second tube end engaging and locking said lever at said second pivotal position.

10. A cargo bar as defined in claim 9 wherein the plurality of tubes are square tubes.

11. A cargo bar as defined in claim 9 wherein said pressure pads each have a rigid center portion defined by an end of said opposed ends, and side portions that are deformable when engaging and bowing opposed truck or van box walls to provide conformity of the pads to the truck or van box walls.

12. A cargo bar as defined in claim 9 wherein openings are provided in the pressure pads at the tube ends, and track pins contained in the tube ends and spring biased through the openings for engaging tracks of a track-type cargo bar system, and a pin and slot combination for retracting and retaining said track pins in a retracted position for use of the cargo bar as a pressure secured cargo bar system.

13. A cargo bar as defined in claim 9 wherein the pinion teeth form a pinion gear that is elliptical for increased teeth engagement as the lever is pivoted toward the second pivotal position.

* * * * *

UNITED STATES PATENT AND TRADEMARK OFFICE
CERTIFICATE OF CORRECTION

PATENT NO. : 6,755,600 B2
DATED : June 29, 2004
INVENTOR(S) : Scott

It is certified that error appears in the above-identified patent and that said Letters Patent is hereby corrected as shown below:

Title page,
Item [73], Assignee, "Burns Bros., Incs" should read -- Burns Bros., Inc. --.

Column 6,
Lines 15-16, "the filly collapsed length" should read -- the collapsed length --.

Signed and Sealed this

Eighth Day of March, 2005

JON W. DUDAS
*Director of the United States Patent and Trademark Office*